Dec. 3, 1929.                P. JODECK                 1,738,070
      APPARATUS FOR CONTINUOUSLY EXPELLING THE SULPHUR
      DIOXIDE FROM MIXTURES OF SULPHUR DIOXIDE AND OIL
                  Filed June 16, 1926
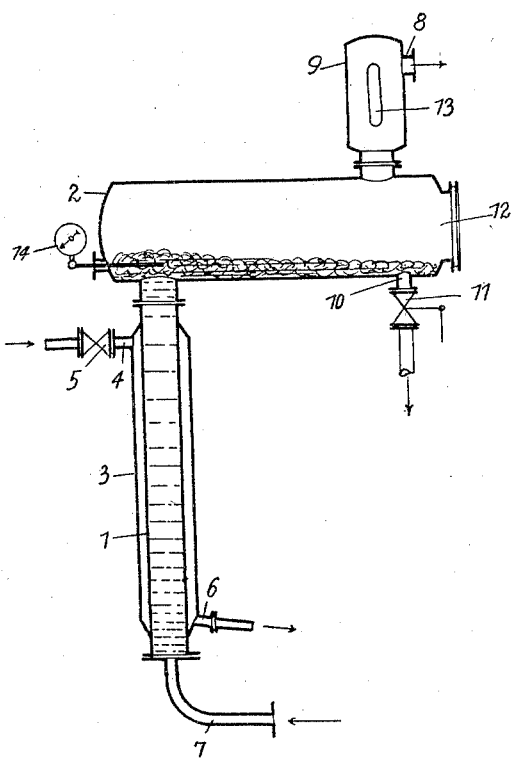
Inventor:
P. Jodeck
By: Marks & Clerk Patented Dec. 3, 1929

1,738,070

UNITED STATES PATENT OFFICE

PAUL JODECK, OF BERLIN, GERMANY, ASSIGNOR TO ALLGEMEINE GESELLSCHAFT FUR CHEMISCHE INDUSTRIE M. B. H., OF BERLIN-SCHONEBERG, GERMANY

APPARATUS FOR CONTINUOUSLY EXPELLING THE SULPHUR DIOXIDE FROM MIXTURES OF SULPHUR DIOXIDE AND OIL

Application filed June 16, 1926, Serial No. 116,447, and in Germany April 12, 1926.

This invention relates to an apparatus for continuously expelling the sulphur dioxide from mixtures of sulphur dioxide and oil.

In the accompanying drawing a constructional example of the apparatus is shown diagrammatically by way of example. The apparatus consists substantially of the vertical evaporating pipe 1 and the upper drum 2. The evaporating pipe 1 (two or more such pipes may be provided) is surrounded by a welded-on heating jacket 3. The heating medium, for instance steam, hot water, hot air and the like, enters at the upper end of the heating jacket 3 through the branch 4, the supply of heating medium being adjusted by the regulating valve 5. Conversely a heating pipe may be placed in the evaporating pipe so that the mixture will flow round the latter on all sides; or both an outer heating jacket and an inner heating pipe may be used together. The heating medium gives off its heat to the evaporating pipe or pipes and the water of condensation or the cooled water flows away through the branch 6. The solution of oil and $SO_2$ enters at the lower end of the evaporating pipe 1 through the branch 7. In passing from the lower to the upper end of the heated pipe surface the oil is heated, the sulphur dioxide contained in it being at the same time evaporated. The bubbles of gas which are formed, rise and produce in the oil a vigorous agitation so that there will be an excellent transmission of heat from the heating surface to all the particles of oil. To the extent, to which the oil moves from the bottom to the top its content of dissolved sulphur dioxide is reduced and its temperature increased. When the oil has reached the upper end of the heated pipe 1, it contains only as much sulphur dioxide as corresponds to the temperature and to the condenser pressure prevailing in the upper drum 2, that is, when heated to +60° C. and at 4 atms. condenser pressure, about 3%. In the upper drum 2 the gas bubbles separate from the oil, the sulphur dioxide gas escapes from the apparatus through the branch 8 of the dome 9 and the oil flows away through the branch 10 and the regulating valve 11. A gauge glass 12 is provided in the upper drum 2 by means of which the oil level and the regulation of the outflow can be observed. On the dome 9 there is also a gauge glass 13, through which it is possible to observe whether the $SO_2$ vapours are carrying away drops of oil or not. The temperature of the outflowing oil is checked by the thermometer 14.

The evaporator described above, besides the excellent heat transmission, has the further advantage of being absolutely reliable in working. There are no welded joints anywhere in the entire heating surface which might cause leakages. The apparatus need not have a great capacity and will therefore be considerably lighter than the evaporators used hitherto.

Having now particularly described and ascertained the nature of my said invention and in what manner the same is to be performed, I declare that what I claim is:—

An apparatus for continuously expelling sulphur dioxide from oil containing the same comprising a horizontal cylindrical drum, a pipe of substantial diameter extending vertically downwardly therefrom, the lower end of said pipe being provided with an inlet for oil to be heated and the upper end being open to said drum and abutting flush with the bottom of the drum, an annular jacket surrounding said pipe and adapted to contain a heating fluid the upper end of said jacket being provided with an inlet for said heating fluid and the lower end being provided with an outlet for said heating fluid, a dome disposed on said drum and open thereto, said dome having a vapor outlet and said drum being provided with an outlet for oil, said outlet being disposed at a point in said drum remote from the upper end of said pipe.

In testimony whereof I affix my signature.

PAUL JODECK.